United States Patent
Geller

(10) Patent No.: US 7,380,471 B2
(45) Date of Patent: Jun. 3, 2008

(54) MICRO GUST THERMAL ANEMOMETER

(76) Inventor: Joseph M. Geller, 105 Hardcastle Ave., Whitesboro, NY (US) 13492

( * ) Notice: Subject to any disclaimer, the term of this patent is extended or adjusted under 35 U.S.C. 154(b) by 46 days.

(21) Appl. No.: 11/451,532

(22) Filed: Jun. 12, 2006

(65) Prior Publication Data

US 2006/0278018 A1    Dec. 14, 2006

Related U.S. Application Data

(60) Provisional application No. 60/765,335, filed on Feb. 4, 2006, provisional application No. 60/689,879, filed on Jun. 13, 2005.

(51) Int. Cl.
*G01P 5/06* (2006.01)
(52) U.S. Cl. .................................... 73/861.85
(58) Field of Classification Search .............. 73/861.85
See application file for complete search history.

(56) References Cited

U.S. PATENT DOCUMENTS

| | | | |
|---|---|---|---|
| 4,648,270 A * | 3/1987 | Johnson et al. | 73/202.5 |
| 4,781,065 A * | 11/1988 | Cole | 73/198 |
| 5,551,283 A * | 9/1996 | Manaka et al. | 73/31.01 |
| 5,616,846 A | 4/1997 | Kwasnik | 73/708 |
| 2007/0013389 A1* | 1/2007 | Grudin et al. | 324/691 |

OTHER PUBLICATIONS

Joe Geller, Micro Gust Thermal Anemometer (MGTA), Nuts & Volts Magazine, Feb. 2006, pp. 40-44, Corona, CA 92879.

LM199/LM299/LM399 Precision Reference, National Semiconductor Corporation, Apr. 2005, DS005717.

Geller Labs MGTA kits, <http://www.gellerlabs.com/MGTA%20kits.htm>, Feb. 2006.

Jim Christensen, Low-Cost Anemometer Fights Dust, Design Ideas, EDN Magazine, Aug. 30, 2001, p. 102-103.

W. Stephen Woodward, Series-Connected Transistors Use Differential Heating To Sense Airlow, electronic design magazine, May 7, 2001.

Stephen Woodward, Self-Heated Transistor Digitizes Airflow, Design Ideas, EDN Magazine, Mar. 14, 1996.

* cited by examiner

*Primary Examiner*—Harshad Patel

(57) ABSTRACT

A thermal anemometer for measuring airflow includes an ovenized semiconductor device including an internal oven. The oven is powered by an oven current such that the oven current varies with air flow over an outside surface of the semiconductor device. A resistor is electrically coupled between a source of power and the oven. An amplifier has an amplifier input and an amplifier output. The amplifier input is electrically coupled to the oven, wherein the amplifier output amplifier provides an electrical signal related to airflow over the ovenized semiconductor device. Also, a method for measuring airflow includes the steps of: providing a source of power, providing an ovenized semiconductor device, providing an amplifier, amplifying a signal representative of a heater current in the ovenized semiconductor device, and outputting the signal representative of the heater current as an indication of airflow over an outside surface of the ovenized semiconductor device.

16 Claims, 2 Drawing Sheets

MICRO GUST THERMAL ANEMOMETER

MICRO GUST THERMAL ANEMOMETER

MICRO GUST THERMAL ANEMOMETER

CROSS REFERENCE TO RELATED APPLICATIONS

This application claims the benefit and priority of U.S. Provisional Application Ser. No. 60/689,879, "Micro Gust Thermal Anemometer", filed Jun. 13, 2005 and U.S. Provisional Application Ser. No. 60/765,335, "Micro Gust Thermal Anemometer", filed Feb. 4, 2006. Both the 60/689,879 and the 60/765,335 provisional applications are hereby incorporated by reference in their entirety.

FIELD OF THE INVENTION

This invention relates generally to thermal anemometers and in particular to a thermal anemometer using a semiconductor sensor.

BACKGROUND OF THE INVENTION

A thermal anemometer is a wind measuring instrument based on a heated element, such as a heated wire. The underlying principle of operation of a heated wire thermal anemometer is that the resistance of the wire changes as heat is removed by the air flowing over the wire. Thermal anemometers generally require complex circuits such as a Wheatstone bridge inside of a closed loop analog servo that controls the voltage applied to the bridge circuit. A variable voltage powers the top of the bridge and a control loop adjusts the voltage to keep the bridge in balance. A variable voltage measured across the bridge can then be converted into a wind speed.

What is needed is an inexpensive circuit topology that can measure small wind speeds.

SUMMARY OF THE INVENTION

A thermal anemometer for measuring airflow includes an ovenized semiconductor device including an internal oven. The oven is powered by an oven current such that the oven current varies with air flow over an outside surface of the semiconductor device. A resistor is electrically coupled between a source of power and the oven. An amplifier has an amplifier input and an amplifier output. The amplifier input is electrically coupled to the oven, wherein the amplifier output amplifier provides an electrical signal related to airflow over the ovenized semiconductor device.

Also, a method for measuring airflow includes the steps of: providing a source of power, providing an ovenized semiconductor device, providing an amplifier, amplifying a signal representative of a heater current in the ovenized semiconductor device, and outputting the signal representative of the heater current as an indication of airflow over an outside surface of the ovenized semiconductor device.

BRIEF DESCRIPTION OF THE DRAWINGS

For a further understanding of these and objects of the invention, reference will be made to the following detailed description of the invention which is to be read in connection with the accompanying drawing, where.

It is to be understood that the drawings are for the purpose of illustrating the concepts of the invention and are not necessarily drawn to scale. While values are given in the schematic diagram of FIG. 1, it is further understood that these are merely exemplary values of a working circuit and that different values can also be used to construct an MGTA according to the invention.

DETAILED DESCRIPTION OF THE INVENTION

Figure 1:
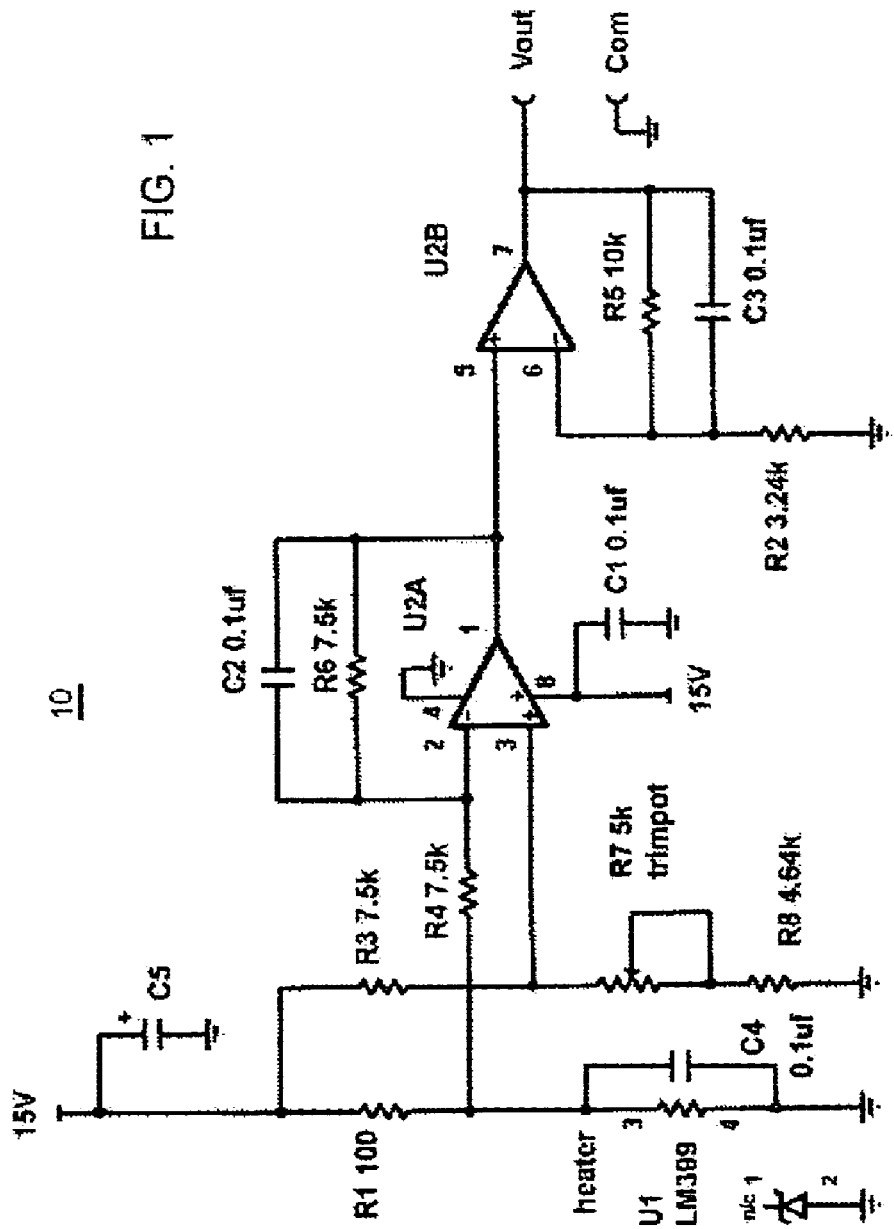
FIG. 1 shows a schematic diagram of an exemplary embodiment of the inventive circuit topology.

FIG. 1 shows an exemplary micro gust thermal anemometer (MGTA) 10 in accordance with the invention. The sensor for the exemplary micro gust thermal anemometer (MGTA) of FIG. 1 is a LM399 voltage reference. The LM399H is a precision temperature stabilized zener diode reference having a zener diode structure that is contained within a temperature controlled oven. As shown in FIG. 1, the LM399 temperature controlled oven can be used as wind speed sensing element.

Even with its special thermally insulating cover, products using the LM399 in its intended role as a precision voltage reference are typically contained within an enclosure, such as a plastic box, to further shield the LM399 from room air currents. While in most LM399 applications the goal is to better insulate the plastic covered part, it was realized that when the outer insulating case is removed from an LM399, the LM399 can alternatively be used as sensitive sensor of very small wind currents.

Continuing with reference to FIG. 1, MGTA 10 offsets and amplifies a voltage signal developed by a series resistor feeding an LM399H heater. R1 can serve dual roles as both the LM399H heater current sense resistor and as a current limiter to prevent a dangerous overheating condition in the event of a short in the LM399. R1, the 100 ohm sense resistor, causes a voltage drop from the 15 V rail proportional to the LM399 heater current. The voltage at the node of R1 and the LM399 heater typically ranges from about 13 V at no wind (such as with a coffee cup over the LM399) to near 9 V full scale (still a very small breeze).

Instead of being connected to actual common, the non-inverting input of U2A is connected to a voltage divider at a bias voltage of about 7 V. Thus, U2A is an inverting amplifier offset by the 7V provided by the divider. Since the divider output is only connected to the high impedance non-inverting input, it is not significantly loaded by the Op Amp. The 7 V offset serves as a reference or bias point about half way on a scale of the 15 V power supply allowing a dual power supply OpAmp to function on a single supply voltage. The exact value of the divider voltage can be calculated using the equation: $V_{divider} = 15V \times ((R7+R8)/(R3+R7+R8))$.

Another embodiment of MGTA 10 was described in U.S. patent application Ser. No. 60/689,879 filed Jun. 13, 2005, entitled "Micro Gust Thermal Anemometer", by the same inventor, where the LM399 (U1) 7 V reference diode, biased to roughly 1 mA reverse zener current by a resistor, creates the offset for the first amplifier. While that embodiment is fully functional, it turns out that a simple resistor divider bias circuit as described herein as FIG. 1 can improve MGTA 10 performance, by reducing sensitivity to changes in power supply voltage. Using this approach, a zero wind set point can be conveniently added using a fixed resistor in series with a trimmer resistor in the lower leg of the bias voltage divider.

Also, according to another invention, a new way to use ovenized reference diodes, such as the LM399H, to further stabilize monolithic voltage reference chips was described. U.S. Patent Application No. 60/641,099, "Voltage Reference with Enhanced Stability" filed Jan. 3, 2005 by the same inventor, describes that work and the 60/641,099 application is hereby incorporated by reference in its entirety. While working with ovenized reference diodes, such as the LM399H, for use in voltage standards, it was learned that even with their plastic thermally insulating cover, these diodes are quite susceptible to room air currents. Over the months of developing voltage standards using these diodes, insulators from Styrofoam coffee cups to bubble wrap were used to protect them from air currents, while making precision measurements to one part per million (1 ppm) or better. One day it occurred to me to stop fighting the insulation problem and to investigate the possibility of using a LM399 as a sensor to measure tiny air currents on the surface of a lab table. A LM399 was removed from its plastic thermally insulating case and powered up on the bench. A digital multimeter (DMM in the current mode) was connected in series with the heater (pins 3,4) power source. A puff of air was blown towards the LM399 from a couple of feet away and the DMM clearly responded a second or so later.

Returning to FIG. 1, it is interesting to note that if the schematic diagram is envisioned as having "rubber band" connections it can be seen that the first stage amplifier can be seen as a conventional one Op Amp instrumentation amplifier design, even though all of the resistors are not perfectly matched when the combination of R7 and R8 are not set exactly to 7.5 k. Otherwise this first stage can be viewed as an inverting amplifier with a gain of R6/R4. Note that if the input voltage at R4 was 7 V, the output voltage of this stage would be 7 V. For the typical input range of voltages noted above, the output voltages for this stage range from about 0.1 V (higher for a non rail to rail OpAmp) at no wind (coffee cup in place) to just under 5 V full scale (a small breeze).

The gain of the U2A stage is near unity given by R6/R4. R4 and C2 also act as a low pass filter to reduce noise at the output (frequency determined by R6/C2). The second amplifier stage, U2B, is a non-inverting amplifier with a gain of (1+(R5/R2)). A second RC pole is created by R5 and C3 for further noise reduction. The two cascaded single pole filters roll off at a couple of hundred Hz as a noise filter. The system response is dominated by the LM399 internal heater loop with a time constant on the order of 2 or 3 seconds. It is contemplated that other ovenized semiconductor devices, such as including, but not limited to other types of ovenized devices, including ovenized voltage reference diodes, such as the LTZ1000 series manufactured by the Linear Technology Corporation of Milpitas, Calif., or that ovenized oscillator devices could be similarly used to measure airflow. Physically smaller ovenized semiconductor devices are preferred for lower airflows (higher sensitivity to airflow).

A typical output range from an MGTA board using a National Semiconductor LM6132BIN operational amplifier (OpAmp) is around 0.3 V (2.5 V or higher with most non rail to rail OpAmps) with a thermal guard (such as a Styrofoam coffee cup) installed and near 14 V for full scale (a slight breeze). The MGTA output signal is thus a voltage level ranging from near 0.2 V to 14 V full scale. For a TI OPA2277 or an Analog Devices OP-297 dual OpAmp the range is about 2.5 V to 13V. The circuit will work with many standard types of Dual OpAmp that can operate reasonably close to the power supply rails. Some OpAmps will give differing end scale values depending on how close their output stages can go to the positive rail or to ground. In a preferred embodiment, the National Semiconductor LM6132BIN can give exceptionally good performance to both rails. The circuit also works fine, albeit with a very slightly reduced range, with the TI OPA2277 or the Analog Devices OP-297 dual OpAmps. Older generation bipolar OpAmps that cannot operate close to the rails are less desirable for this application. For example in this application, an LM1458 can only operate over a greatly reduced output scale starting around 6 V.

The "rails" or positive and negative power supply voltages are the limits of the voltage range available in an amplifier circuit. In a traditional OpAmp circuit powered by +/− 15 power supplies (more commonly +/−5 V today), the rails are +1-15 V, or the positive rail is +15 V and the negative rail is −15 V. The typical "head room" needed for proper OpAmp operation ranges from 1 to 4 volts. That is, the input or output voltages should generally not exceed +/−11 V where the allowable range is within 4 V of the rail.

OpAmps have two ratings, a maximum input range and a maximum output range. The input range is called the input "Common-Mode voltage range" and the output range is often called the "output voltage swing". Both the common mode input range and output swing have two values, a minimum voltage (how close the OpAmp can operate to the lower rail) and a maximum voltage (how close it can operate to the upper rail). While many amplifier circuits cannot operate close to the rails, "rail to rail" OpAmps are the exception. An OpAmp rated as rail to rail generally can accept an input voltage very near or at the rails (the input common mode range), and an output voltage to within about 100 mV to 500 mV of either rail or better.

In the exemplary MGTA circuit of FIG. 1, both limits are important. The output of the first OpAmp stage (U2A) should go very near common, the output negative or lower rail, because any voltage present at the output of U2A at zero wind, is further amplified by U2B or multiplied by about 4, the gain of the second stage amplifier. For example, if the input to the U2B second stage (at U2B pin 3) is 0.6 V, the minimally achievable second stage output is 4×0.6V or 2.4 V, a typical zero wind value.

Some OpAmps can operate closer to the rails than specified in the data sheets, especially with light loading. The TI OPA2277 and the Analog Devices OP-297 has been used with good success, but it should be noted that at either end of the scale the specifications for these Op Amps are being violated. The TI OPA2277 and the Analog Devices OP-297 are extremely precise OpAmps when used as intended, but these OpAmps are not rated to maintain closed loop (OpAmp) performance very near to either rail. This violation will not damage or reduce the life to the OpAmp, but it does mean that at the lower end of the scale (very near a zero wind set point of 2.5 V), there will be a small range of non-linear operation and then a dead zone where the OpAmp saturates to a small value near common.

The National Semiconductor LM6132BIN gives exceptionally good performance to both rails and is rated for both input and output rail to rail operation. This OpAmp can operate almost all the way to common (the lower rail). The input (common mode) voltage range is all the way to both rails, and the output swing is to within better than about 200 mV of either rail, typically better than 100 mV with operation between 15 V and common. Using an LM6132BIN, the zero wind value can be set as low as about 0.1 V at the output of U2A, giving a zero wind output below 0.5 V. There are many other rail to rail OpAmps available today, but few that can operate on a 15 V power supply (The relatively high 15 V rail voltage is needed to power the LM399 oven).

Note that C5 is available for especially noisy environments. It can be an additional ceramic capacitor or a tantalum or electrolytic capacitor. Best operation is achieved with a 15 V linear power supply, but a switcher should be okay too if C5 is installed.

Figure 2:
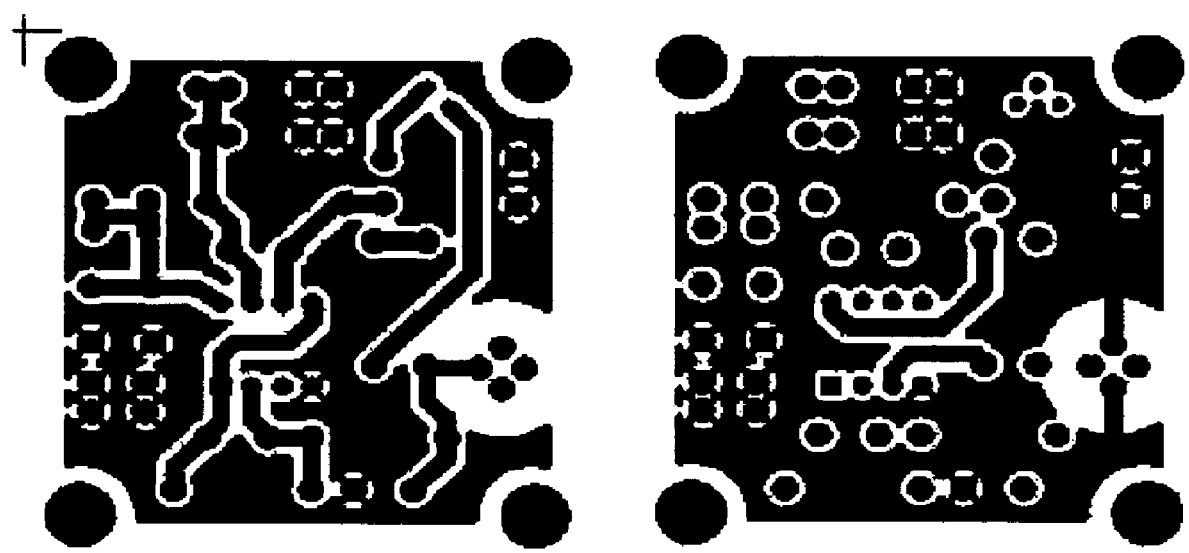
FIG. 2 shows an exemplary printed circuit board for the circuit of FIG. 1.

A printed circuit board (PCB) was designed so that the leads get slightly spread apart when the part is inserted in the PCB. FIG. 2 shows an exemplary PCB suitable for use as an MGTA. This allows for more convenient alignment and also for larger soldering pads. In a preferred embodiment, the LM399 can be placed off to one side of the PCB and use similarly sized PCB pads so as not to cause any large asymmetrical thermal paths from the Kovar leads. The LM399 can be mounted directly on the board without trimming the leads so that it stands up as high as practical. The LM399 can also be fashioned as a probe using a twisted shielded cable. In one embodiment, a probe can be made by connecting the oven (−) to one wire (black), the oven (+) to the other wire (red), with no connection to the shield at the sensor side. At the circuit board side, the shield and the black wire can be connected to circuit common and the oven (+) wire to the junction of R1/R4 as if the LM399 were mounted on the circuit board.

While originally designed as a hobby project for amateur scientists, the MGTA can be used in far more sophisticated experiments and applications as a wind sensor. A muffin fan can be used to create a calibration plot of fan speed versus MGTA output voltage. A control loop could be designed to using the MGTA board to generate a feedback signal to control wind speed. Also, an MGTA or similar type thermal anemometer could be useful to measure model airplane airspeeds, particularly at low airspeeds such as with model gliders. Or, an MGTA could be useful in a model or low speed wind tunnel. Several MGTAs could be situated around a heater to measure direction. MGTAs can also be used as leak detectors to measure draughts near windows or doors.

An oscilloscope, DVM, DMM, or analog meter can be used to view the MGTA response to blowing a puff of air at it from several feet away. The MGTA can be calibrated for scale, offset and any non-linear response using techniques known in the art including analog and digital scaling and linearization techniques in hardware or in software. Software routines can be performed by an on board microcomputer or done as post processing. Since the absolute output will change with ambient temperature as the oven draws the current it needs to hold its temperature set point across a range of ambient temperatures hardware or software temperature compensation can also be done to maintain calibration of wind measurement over a range of temperatures. Such compensation can be linear or non-linear compensation or a combination of the two. Analog and digital filtering, including digital FIR or IIR filters can be used to further enhance the response of the MGTA to winds comprise various frequency components as changes in air pressure and changes in air movement of parcels of air.

The analog output voltage can be changed to an output current using such techniques as a series resistor or a discrete or integrated circuit to generate a current output such as a 4 to 20 milliamp output. A voltage to frequency converter ("VFC") can be used to generate an output frequency representing MGTA measured wind speed. An analog to digital converter ("ADC") can also be used to generate digital representations wind detected by an MGTA.

It should be noted that while in one preferred embodiment, the thermally insulating plastic cover that comes installed on an LM399H reference diode is removed for maximum wind speed sensitivity, the cover could also be left on for a far less sensitive wind scale. The top plastic cap can be easily pried from a LM399 insulating case. Or, a cover can be made to sit below a LM399H mounted above the board. The original cover or an equivalent cover can be lowered on the mounting electrical leads (or removed from above) to expose a LM399 metal case for a maximum sensitivity to wind speed, or raised (or otherwise installed) for a less sensitive scale. A third wind scale can be made by reinstalling a cover section over a partially disassembled lower cover section raised over the lower section of a LM399H, but open on top until a cover is installed.

It can now be seen that a thermal anemometer for measuring airflow comprises an ovenized semiconductor device including an internal oven. The oven can be powered by an oven current such that the oven current varies with air flow over an outside surface of the semiconductor device. A resistor can be electrically coupled between a source of power and the oven. An amplifier has an amplifier input and an amplifier output. The amplifier input can be electrically coupled to the oven, wherein the amplifier output amplifier can provide an electrical signal related to the airflow over the ovenized semiconductor device.

The semiconductor ovenized semiconductor device can be an ovenized voltage reference semiconductor device and the ovenized voltage reference semiconductor device can be an LM399AH, LM399H, LM299AH, LM199AH, or an LM199AH/883. The amplifier can include an offset amplifier and two or more amplifier stages. The two or more amplifier stages can include one or more inverting amplifier or non-inverting amplifiers. The amplifier stages can include low pass filtering. The amplifier can also include at least one rail to rail OpAmp.

The measured airflow can be the airflow in a wind tunnel, the airflow over a work table, where the measurement of the airflow over a work table can be used to study the performance of one or more parameters of one more devices under test with respect to the airflow. The airflow can also be an indoor airflow and the amplifier output amplifier can provide an electrical signal is used with at least one sound generating circuit to create sounds as an indoor wind chime. The airflow can also be an air leak, and a measurement of the airflow indicates an air leak at a door or window.

A method for measuring airflow can included the steps of: providing a source of power, providing an ovenized semiconductor device, providing an amplifier, amplifying a signal representative of a heater current in the ovenized semiconductor device, and outputting the signal representative of the heater current as an indication of an airflow over an outside surface of the ovenized semiconductor device. The step of providing an ovenized semiconductor device can include providing an ovenized semiconductor voltage reference device.

A thermal anemometer for measuring airflow can also include: an ovenized semiconductor device having an oven means for heating the internal temperature of the ovenized semiconductor device to a predetermined temperature, a current sensing means for measuring a current flow from a power source into the oven means, and an amplifier means for amplifying an electrical signal from the current sensing means. The amplifier means can be electrically coupled to the current sensing means, wherein the amplifier means outputs an electrical signal related to the airflow over a surface of the ovenized semiconductor device. The ovenized semiconductor device can be an ovenized voltage reference device.

For those less familiar with the art of ovenized voltage references, a voltage reference can use a small device comprising a zener diode type semiconductor element, an internal heater, and a temperature control circuit. The internal heater of the device package maintains the internal semiconductor elements at nearly constant temperature. Such devices can further include second and third order correction devices such as junctions and transistors on the same die. This type of device is typically packaged in a standard semiconductor package. The device package can further comprise optional outer layers of insulation, such as a plastic outer casing, to further thermally isolate the tiny oven controlled environment from the ambient atmosphere. Classic devices of this type include the National Semiconductor LM199/LM399 families. More sophisticated versions, as Linear Technology's LTZ1000 families are capable of the highest levels of precision with short term changes in voltage with temperature of better than 0.1 part per million ("ppm")/degree C. These devices however can only generate a single voltage typically falling between 6.8 and 7.1 Volts. And, they do not include an internal amplifier for driving reference loads. Ovenized devices are typically available only in fixed non-standard voltages, such as between 6.9 and 7.1 Volts. And, ovenized devices such as the LM399 or LTZ1000 families do not generally incorporate output amplifiers to drive a load coupled to the reference.

The ovenized voltage reference device can be an LM399AH, LM399H, LM299AH, LM199AH, or an LM199AH/883. The current sensing means can include a resistor. The amplifier means can include at least one rail to rail OpAmp.

While the present invention has been particularly shown and described with reference to the preferred mode as illustrated in the drawing, it will be understood by one skilled in the art that various changes in detail may be effected therein without departing from the spirit and scope of the invention as defined by the claims.

I claim:

1. A thermal anemometer for measuring airflow comprising:
   a voltage reference including an internal oven, said oven powered by an oven current such that said oven current varies with air flow over an outside surface of said semiconductor device;
   a resistor electrically coupled between a source of power and said oven; and
   an amplifier having an amplifier input and an amplifier output, said amplifier input electrically coupled to said oven, wherein said amplifier output provides an electrical signal related to an airflow over said voltage reference including an internal oven.

2. The thermal anemometer of claim 1 wherein said voltage reference including an internal oven is selected from the group of voltage references including an internal oven consisting of LM399AH, LM399H, LM299AH, LM199AH, and LM199AH/883.

3. The thermal anemometer of claim 1 wherein said amplifier comprises an offset amplifier.

4. The thermal anemometer of claim 1 wherein said amplifier comprises two or more amplifier stages.

5. The thermal anemometer of claim 4 wherein said two or more amplifier stages comprise an inverting amplifier and a non-inverting amplifier.

6. The thermal anemometer of claim 4 wherein said two or more amplifier stages include low pass filtering.

7. The thermal anemometer of claim 1 wherein said airflow is an airflow in a wind tunnel.

8. The thermal anemometer of claim 1 wherein said airflow is an airflow over a work table, and a measurement of said airflow over a work table is used to study a performance of one or more parameters of one more devices under test with respect to said airflow.

9. The thermal anemometer of claim 1 wherein said airflow is an indoor airflow and said amplifier output amplifier provides an electrical signal used with at least one sound generating circuit to create sounds as an indoor wind chime.

10. The thermal anemometer of claim 1 wherein said airflow is an air leak, and a measurement of said airflow indicates an air leak at a door or window.

11. The thermal anemometer of claim 1 wherein said amplifier includes at least one rail to rail OpAmp.

12. A method for measuring airflow comprising the steps of:
   providing a source of power;
   providing a voltage reference including an internal oven;
   providing an amplifier;
   amplifying a signal representative of a heater current in said voltage reference including an internal oven; and
   outputting said signal representative of said heater current as an indication of an airflow over an outside surface of said voltage reference including an internal oven.

13. A thermal anemometer for measuring airflow comprising:
   a voltage reference having an internal oven means for heating said internal temperature of said voltage reference having an internal oven means to a predetermined temperature;
   a current sensing means for measuring a current flow from a power source into said oven means; and
   an amplifier means for amplifying an electrical signal from said current sensing means, said amplifier means electrically coupled to said current sensing means, wherein said amplifier means outputs an electrical signal related to an airflow over a surface of said voltage reference having an internal oven means.

14. The thermal anemometer of claim 13 wherein said voltage reference having an internal oven means is selected from the group of voltage references having an internal oven means consisting of an LM399AH, LM399H, LM299AH, LM199AH, and LM199AH/883.

15. The thermal anemometer of claim 13 wherein said current sensing means comprises a resistor.

16. The thermal anemometer of claim 13 wherein said amplifier means comprises at least one rail to rail OpAmp.

* * * * *